H. A. FOSTER.
WATERER AND FEEDER.
APPLICATION FILED MAR. 25, 1921.

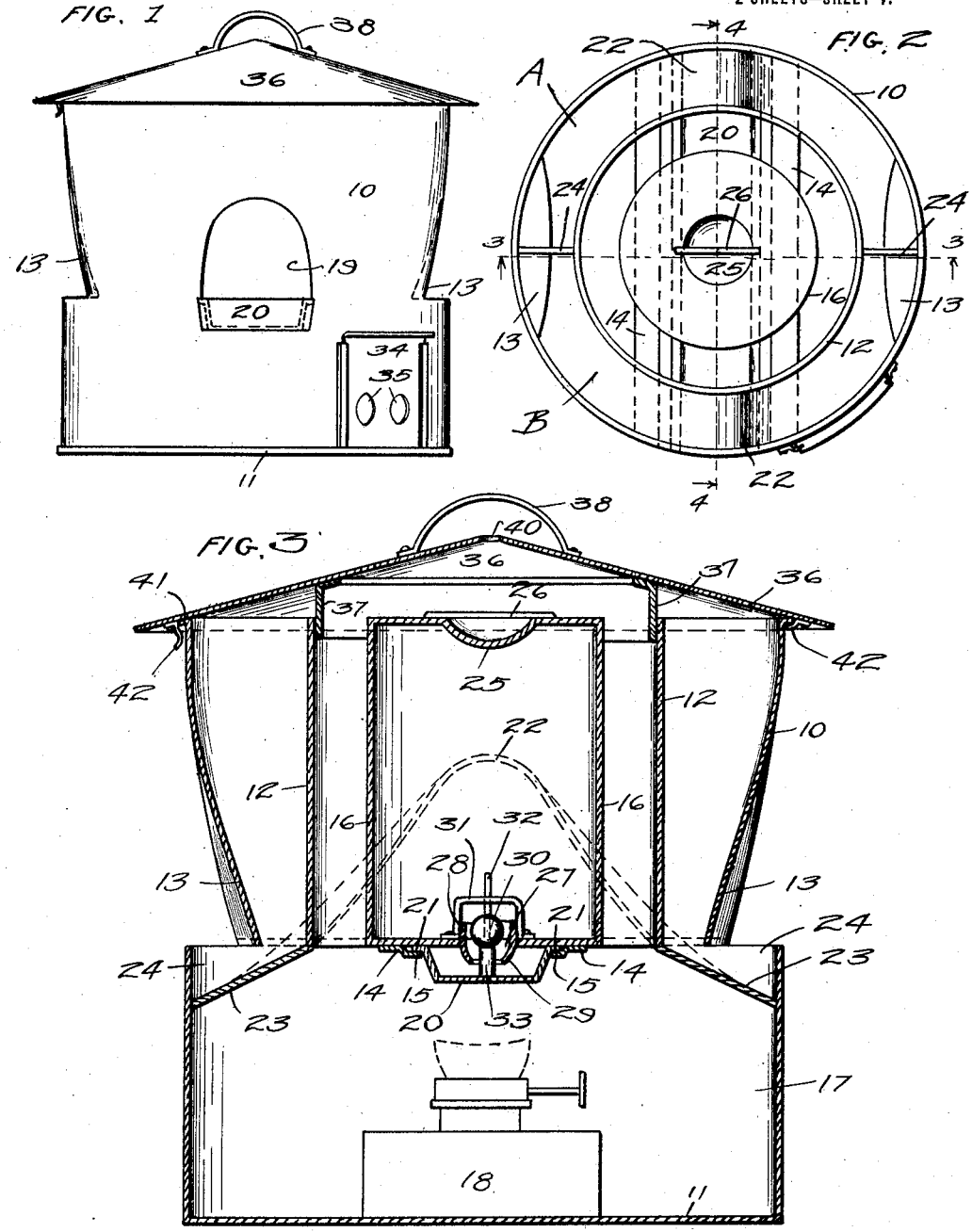

1,391,824.

Patented Sept. 27, 1921.
2 SHEETS—SHEET 2.

INVENTOR
Henry A. Foster
By Bair & Freeman
ATTYS.

UNITED STATES PATENT OFFICE.

HENRY A. FOSTER, OF DES MOINES, IOWA.

WATERER AND FEEDER.

1,391,824.    Specification of Letters Patent.    Patented Sept. 27, 1921.

Application filed March 25, 1921. Serial No. 455,687.

*To all whom it may concern:*

Be it known that I, HENRY A. FOSTER, a citizen of the United States, and a resident of Des Moines, in the county of Polk and State of Iowa, have invented a certain new and useful Waterer and Feeder, of which the following is a specification.

The object of my invention is to provide a waterer and feeder for chickens and the like, which device is of simple and inexpensive construction.

More particularly, it is my object to provide a combined waterer and feeder, in which the outer wall of the waterer forms the inner wall of the feeder, and the feed chamber surrounds the waterer, so as to afford an insulating wall for both cold and hot weather.

A further object is to provide such a combined waterer and feeder, having various novel and important features of construction, whereby there is effected a saving in cost of manufacture and increased efficiency in the completed device.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a side elevation of a combined waterer and feeder, embodying my invention.

Fig. 2 shows a top or plan view of the same with the cover removed.

Fig. 3 shows a transverse, vertical, sectional view taken on the line 3—3 of Fig. 2.

Figure 5:
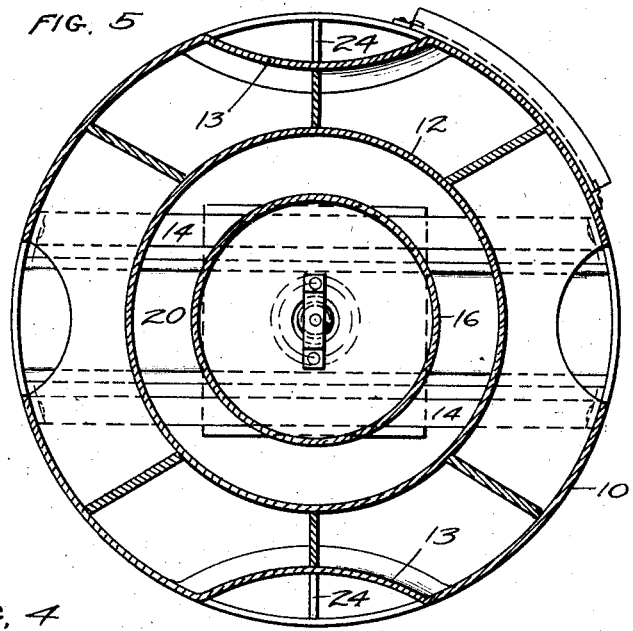
Fig. 5 shows a horizontal sectional view taken on the line 5—5 of Fig. 4.

My improved combined waterer and feeder comprises an outer, cylindrical casing, which I have indicated in the accompanying drawings, by the reference numeral 10. The casing 10 forms the outer wall of the feeder.

Figure 4:
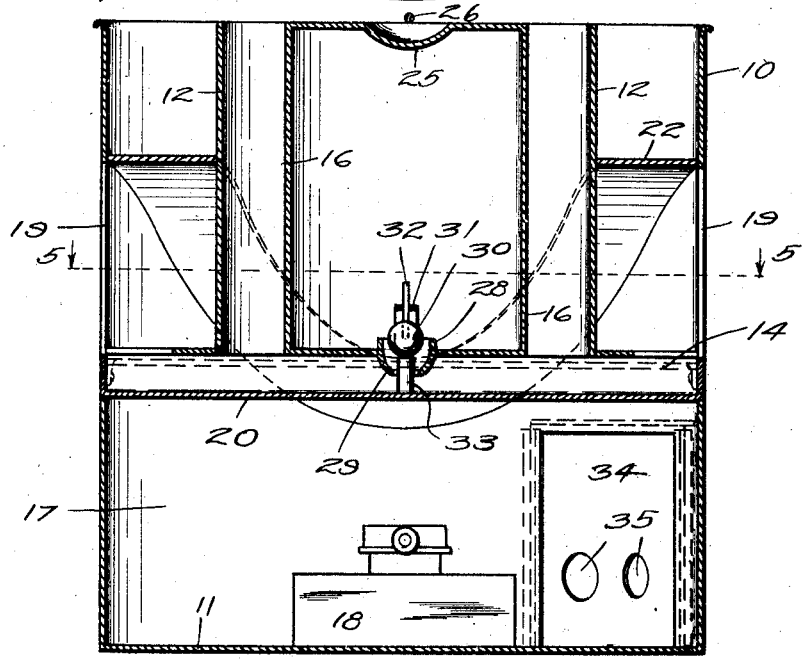
Fig. 4 shows a vertical, sectional view taken on the line 4—4 of Fig. 2.

This casing is preferably provided with a bottom 11. Spaced inwardly from the casing 10 is a second casing 12, which terminates considerably above the bottom 11, as shown especially in Figs. 3 and 4.

On opposite sides of the casing 10, portions 13 of the wall of the casing 10 are forced inwardly, as shown in Figs. 1 and 3.

For accomplishing the positioning of the portions 13, horizontal slits are cut in the wall 10 and the portions above the slits are then forced inwardly.

The compartment or space between the casings 12 and 10 comprises a feeder. Extending across the inside of the casing 10 just below the casing 12 are spaced horizontal cross members 14, illustrated for instance in Figs. 2, 3, 4 and 5. At the inner adjacent edges of the cross supporting members 14 are depressed flanges 15 to support the edges of the trough, which will be hereafter described.

The casing 12 forms the inner wall of the feeder and the outer spaced wall of the watering device.

I provide a water tank 16 closed at its upper end and designed to rest against the cross members 14 and spaced inwardly from the wall or casing 12.

It will thus be seen that there is an air space left between the tank 16 and the casing 12, and it will be understood that there is a casing or compartment 17 below the feed compartment and water tank to receive a lamp or heater or the like 18.

At the opposite sides of the casing 10 at the ends of the supports 14 and arranged preferably substantially equi-distantly from the respective portions 13, the casing 10 is provided with openings 19 to permit access to a trough 20, which has flanges 21, which are slidably supported on the flanges 15.

The trough 20 may be slid in from the side of the device and may be readily and easily removed.

The space between the walls of the casing 10 and 12 is divided into feed compartments by means of bottom and partition members. Each bottom and partition member, as indicated by the reference character 22, comprises a strip extending from the wall 10 to the wall 12. These members 22 are inclined from their upper central portions above the respective openings 19 downwardly and around the casings to the lower parts of the pressed-in portions 13. Spaced below the pressed-in portions 13 are bottom members 23, forming bottoms for feed troughs, and connecting the members 22.

The space between the casings 10 and 12 is divided into feed compartments by vertical radially arranged partitions 24, which are arranged above the bottoms 23.

It will thus be seen that if one kind of feed is poured into the compartment marked A in Fig. 2, and another kind of feed into the compartment marked B, part of the feed in each compartment will, on account of the peculiar shape of the members 22, flow downwardly to each of the feed troughs and that both kinds of feed will thus be supplied to each feed trough above the respective bottoms 23.

The raised central portion of each member 22 and the inclined portions thereof on each side of the raised central portions allow proper space for the access to the ends of the drinking troughs, and also form means for causing the feed to flow downwardly from each feed compartment into both feed troughs.

It may be mentioned that the bottom members 23 and the members 22 may be made integral with each other except for practical difficulties in construction.

The upper end of the water tank 16 has a depressed portion 25 above which there is soldered a cross rod 26, which serves as a handle, which handle will not interfere with inverting the water tank and setting it on the ground or the like.

In the bottom of the water tank 16 is an opening 27, in which is mounted a cylindrical member 28, the lower end of which is pressed inwardly somewhat to form a seat 29, having a ball valve 30. Above the opening 27 is a U-shaped bracket 31, in which is slidably mounted a vertical pin or post 32 connected with the ball 30 for holding the ball against accidental movement when the water tank is inverted for filling.

In the trough 20 in the central part thereof is an upwardly extending post 33. After the trough has been installed, then when the tank is placed in position, the post 33 will project upwardly into the cylinder 28 and raise the ball 30 off its seat, so that water will flow from the tank 16 downwardly into the trough 20 until the water in the trough reaches the lower end of the member 28 and forms a water seal.

On the outside of the wall of the casing 10 at the lower part thereof is a sliding door 34 having ventilation holes 35 and designed to be opened to permit access to the lamp 18.

I provide for my entire device a cover member 36, having a downwardly extending annular flange 37 adapted to snugly fit the casing 12. The cover 36 has a handle 38, and also has one or more ventilation holes 40.

In the practical use of my combined waterer and feeder, the cover is removed and the tank is taken out of the device and the trough 20 is slid into place.

The tank 16 may be inverted and filled and then may be turned right side up and placed in position inside the casing 12 with the post 33 projecting into the cylindrical member 28. The heating element 18 may then be placed in the device below the water tank by inserting it through the door opening.

Feed may then be poured into the respective feed compartments and the cover 36 installed in position.

On the upper end of the casing 10 is a flange 41 and the cover 36 may be provided with suitable hook devices 42 to coact with said flange for fastening the cover in position.

The heater will supply heat to the tank and to the space around the tank 16 within the casing 12.

It will be seen that a device of the kind herein described has a number of advantages.

I am enabled to make both a feeder and a watering device at a much less cost than the two devices could be made separately.

The inner wall of the feeder serves as the outer wall of the waterer. The feed helps to prevent the escape of warm air around the tank during cold weather and serves also to keep the water cool in warm weather.

The combined heater and feeder occupy much less space than would a separate heater and waterer.

The construction of the entire device is comparatively simple and inexpensive.

With my device much less heat is necessary for preventing the freezing of the water in cold weather, than would be the case where the feeder element were omitted.

Some changes may be made in the arrangement and construction of the various parts of my device, without departing from the essential features and purposes of my invention, and it is my intention to cover by my claims, any modified forms of structure or use of mechanical equivalents, which may be reasonably included within their scope.

I claim as my invention:

1. In a device of the class described, an outer cylindrical casing, an inner casing spaced from said outer casing and terminating short of the lower end of said outer casing, supporting members mounted in said outer casing substantially at the lower edge of the inner casing, a tank arranged to rest on said supporting members within the inner casing and spaced therefrom, a water trough arranged below said inner casing and tank and projecting to the outer casing, said outer casing having openings for permitting access to the ends of said trough, a partition member between the outer and inner casing, having raised portions above the ends of said trough and lower portions at points between the ends of the trough, said lower portions forming the bottom of troughs for feed, the walls of said outer casing being cut and forced inwardly above the lower parts of said partition to provide access to such lower parts, said lower parts of said partition being inclined downwardly and outwardly and terminating at their outer edges below the points where said outer casing is cut.

2. In a device of the class described, an outer cylindrical casing, an inner casing spaced from said outer casing and terminating short of the lower end of said outer casing, supporting members mounted in said outer casing substantially at the lower edge of the inner casing, a tank arranged to rest on said supporting members within the inner casing and spaced therefrom, a water trough arranged below said inner casing and tank and projecting to the outer casing, said outer casing having openings for permitting access to the ends of said trough, a partition member between the outer and inner casing, having raised portions above the ends of said trough and lower portions at points between the ends of the trough, said lower portions forming the bottom of troughs for feed, the walls of said outer casing being cut and forced inwardly above the lower parts of said partition said lower parts of said partition being inclined downwardly and outwardly and terminating at their outer edges below the points where said outer casing is cut, radially arranged partition members on the lower parts of said first partition member, said radially arranged members and said raised portions of the partition member serving to divide the space between the casing members into separate feed compartments.

Des Moines, Iowa, March 14, 1921.

HENRY A. FOSTER.